ively used steroids. The

United States Patent Office 3,039,937
Patented June 19, 1962

3,039,937
PREPARATION OF 1-HYDROXYLATED STEROIDS
Louis I. Feldman, Spring Valley, and Louis M. Pruess, Pearl River, N.Y., and Neil E. Rigler, Ridgewood, N.J., assignors to American Cyanamid Company, New York, N.Y., a corporation of Maine
No Drawing. Filed Feb. 12, 1959, Ser. No. 792,702
8 Claims. (Cl. 195—51)

This invention relates to a method of producing steroids by microbiological action. More particularly, it relates to a method of introducing a 1-hydroxyl group by fermentation into steroids of the pregnane series.

Prior to this invention, hydroxyl groups were introduced by fermentation of steroids in various positions, such as the 11-, 17-, or 21-position. However, no good method existed for the preparation of 1-hydroxyl steroids of the pregnane series.

It has now been found that steroids of the pregnane series can be fermented by certain species of the genus Streptomyces which will produce a 1-hydroxylated steroid of the pregnane series in good yields.

It has further been found that the 1-hydroxylated steroids of the pregnane series are useful as starting materials for the preparation of triamcinolone, prednisolone, prednisone, and similar commercially used steroids. The 1-hydroxy steroids can be dehydrated to produce the corresponding $\Delta^1$-compound. Among the steroids which can be oxidized by the process of the present invention are those of the pregnane series, unsubstituted in the 1-position, particularly those having a 3,20-diketo pregnane structure.

Examples of suitable steroids of the pregnane series include hydrocortisone, $9\alpha$-fluoro-hydrocortisone, $16\alpha$-hydroxy-$9\alpha$-fluoro-hydrocortisone, $6\alpha$-methyl-$\Delta^1$-hydrocortisone, 11-desoxycorticosterone, progesterone, triamcinolone ($9\alpha$-fluoro-$11\beta,16\alpha,17\alpha,21$-tetrahydroxy-1,4-pregnadiene-3,20-dione), $16\alpha$-hydroxy-hydrocortisone, $9\alpha$-fluoro-$6\alpha$-methyl-$\Delta^1$-hydrocortisone, Substance S, $\Delta^{9(11)}$-Substance S, and esters thereof. Among the steroids formed by the process of the present invention when the above intermediates are used are the 1-hydroxyl derivatives of the pregnane series, such as 1-hydroxy-$9\alpha$-fluoro-hydrocortisone, 1,$16\alpha$-dihydroxy-$9\alpha$-fluoro-hydrocortisone, 1-hydroxy-$6\alpha$-methyl-$\Delta^1$-hydroxycortisone, 1-hydroxy-11-desoxycorticosterone, 1-hydroxy-progesterone, 1-hydroxy-triamcinolone, 1,$16\alpha$-dihydroxy-hydrocortisone, 1-hydroxy-$9\alpha$-fluoro-$6\alpha$-methyl-$\Delta^1$-hydrocortisone, 1-hydroxy-Substance S, 1-hydroxy-$\Delta^{9(11)}$-Substance S, and the like.

The microorganisms useful for the present process include many species of Streptomyces. Representative of the Streptomyces species useful as microbiological oxidants are *S. aureofaciens*, *S. aureus*, *S. purpureochromogenus*, *S. lavendulae*, *S. griseocarneus*, *S. rubrireticuli*, *S. antibioticus*, *S. nitrosporeus*, *S. celluloflavus*, *S. viridifaciens*, and *S. fulvissimus*, and the like. A description of these Streptomyces can be found in reference books such as Actinomyces and Their Antibiotics, by Waksman and Lechevalier.

While some Actinomyces when grown in the presence of steroids of the pregnane series produce 11-hydroxylation, those described above as species of Streptomyces do not react in this manner.

In general, the conditions of culturing the Streptomyces species for the purpose of the present invention are the same as those of culturing various Streptomyces for the production of antibiotics described in the biological and patent literature, that is the microorganism is aerobically grown in contact with or in a suitable fermentation medium with the steroid substrate present. A suitable medium comprises essentially a source of nitrogenous and growth promoting factors and an assimilable source of carbon and trace elements. The carbon may be in the form of carbohydrate or the steroid itself in some cases. Preferably, the medium includes an assimilable source of carbon in addition to the steroid. The use of fat or oils as a source of carbon is advantageous and improves the availability of the steroid for conversion.

The nitrogen source material can be organic, such as soybean meal, corn steep liquor or meat extract, or it can be synthetic, such as ammonium salts, alkali nitrates, amino acids, urea, and so forth.

It is to be noted that other carbon-containing materials can also be used, for example, glycerol, glucose, frutose, lactose, maltose, dextrins, starch, and the like. These materials may be used in the purified state or as concentrates, such as concentrates of corn, wheat or barley as a mash or mixtures of the above may be used.

Following the fermentation of the various steroids in a medium containing a Streptomyces species, the product is extracted by means well known in the fermentation field. The steroids can be purified by chromatography and by other well-known means.

The compounds of the present invention are useful for their anti-inflammatory properties, since the compounds have glucocorticoid activity. The compounds are also useful as intermediates in the preparation of $\Delta^1$-steroid, wherein the hydroxyl group in the 1-position and the hydrogen in the 2-position are split out giving the $\Delta^1$-bond.

The compounds of the present invention are prepared by the detailed procedures of the following examples.

Example 1

Twelve liters of fermentation medium prepared from Medium No. 64, corn steep liquor, 3.0%; glucose, 3.0%; soybean oil, 0.5%; calcium carbonate, 0.5%; is inoculated with 200 ml. of a 24 hour growth of organism *S. ruber* (*S. aureofaciens*) NRRL B 1268) and incubated at 28° C. with aeration and agitation according to conventional methods. Three grams of the substrate $9\alpha$-fluoro-$11\beta,17\alpha,21$-trihydroxy-4-pregnene-3,20-dione dissolved in 120 ml. of methanol is added and the fermentation continued for 5 days. At the end of this time, the mash is filtered with the aid of diatomaceous earth giving a filtrate of 9 liters. This filtrate is extracted 3 times with an equal volume each time of ethyl acetate. The mycelial pads originally filtered form the mash are digested in 4.5 liters of water at 50–60° C., and the aqueous digest extracted with 4.5 liters of ethyl acetate. The four ethyl acetate extracts are pooled, giving a total ethyl acetate solution of about 36 liters. This solution is concentrated under vacuum to approximately 1 liter, giving a turbid yellow concentrate. The concentrate is rinsed first with two 200-milliliter portions of 2% aqueous sodium bicarbonate and then with two 100-milliliter portions of water giving a substantially clear and pale yellow ethyl acetate solution. The solution is dried over 50 grams of anhydrous sodium sulfate, and concentrated under reduced pressure to a dry residue. The residue is dissolved in 50 ml. of the lower phase of the solvent system obtained by mixing 1 part water, 5 parts dioxane, 3 parts cyclohexane, and allowing separation of the two phases. Two hundred grams of diatomaceous earth are mixed with 100 ml. of the lower phase of the same solvent mixture, and this mixture packed in a glass chromatographic tube to give a diatomaceous column having a diameter of approximately 45 millimeters, and a height of about 58 centimeters. The solution of residue in 50 ml. of the lower phase is mixed with 98 grams of diatomaceous earth and this mixture is packed on the top of the column. The column is then developed with the upper phase of the solvent mixture. The 612 ml. of percolate which is collected after the first 1264 ml. of percolate is separated and concentrated to dryness under reduced pressure, yielding a yellow crystalline mass. This material is washed with ether, and the resulting white crystals separated by centrifugation. The crystals are dissolved in a minimum of hot ethyl acetate, and the solution is filtered, and the filtrate concentrated to 20 ml. Upon cooling, the product crystallizes from solution. The crystals are separated by centrifugation, washed with ether, and dried. This yield is 152 mg. of the steroid. The crystals which are recrystallized from an acetone-ethyl acetate solution as 9α-fluoro-1,11β,17α,21-tetrahydroxy-4-pregnene-3,20-dione have the following properties: paraphenylaminediamine test—positive; blue tetrazolium—positive. Quantitative BT (blue tetrazolium) showed 52% of color produced by 16α-hydroxy-9α-fluorohydrocortisone. Melting point 248–254° C. (uncorr. Fisher-Johns block). $\lambda_{max}$. (MeOH 237 mμ) ($\epsilon$15,900).

Sulfuric acid chromogen $\lambda_{max}$. mμ, ($\epsilon_{1\,cm.}^{1\%}$) 280 (550); 396 (240); 500 (55);

$\lambda_{min}$. mμ ($\epsilon_{1\,cm.}^{1\%}$) 249 (165); 315 (106); 450 (40);

$[\alpha]_D^{25}$ +122° (methanol). Solution in 0.066 N methanolic NaOH: run immediately, $\lambda_{max}$. 236 mμ, $\epsilon_{1\,cm.}^{1\%}$ 448 after 2 hours at 60°, $\lambda_{max}$. 238 mμ, $\epsilon_{1\,cm.}^{1\%}$ 448 plateau about 365, $\epsilon_{1\,cm.}^{1\%}$ 84

The infra-red spectrum (KBr pellet) showed maxima at 2.93, 3.41, 5.86, 6.02, 6.15, 9.45, 9.66μ.

*Example 2*

A further experiment was carried out using *S. antibioticus* (ATCC 11891), the same substrate and fermentation medium as in Example 1. The product obtained was 9α-fluoro-1,11β,17α,21-tetrahydroxy-4-pregnene-3,20-dione.

*Example 3*

Eleven liters of fermented mash such as described in Example 1 are filtered, extracted with ethyl acetate and concentrated under reduced pressure to approximately 1 liter as described in Example 1. Two grams of activated carbon is added and the mixture stirred and filtered. The filtrate is concentrated to a dry residue under reduced pressure. The crystalline residue is washed with ether, and the washed crystals separated by filtration and dried. The yield is 1.20 grams of the 1-hydroxylated pregnene identical with that of Example 1.

*Example 4*

Twelve liters of fermentation medium is prepared, inoculated with organism *S. antibioticus* (ATCC 11891) and incubated according to the previous method described in Example 1. Three grams of substrate 17-hydroxycorticosterone (Compound F) dissolved in 120 ml. of methanol is added and the fermentation continued for 54 hours. The mash is filtered with the aid of diatomaceous earth, giving a filtrate of 9 liters. This filtrate is extracted three times with an equal volume of ethyl acetate. The mycelial pads originally obtained from the mesh filtrate are digested and slurried with 5 liters of water at 50–60° C., the mycelium filtered and discarded. The hot water extract is extracted twice with 5 liters of ethyl acetate. The four ethyl acetate extracts are pooled giving a total volume of 36 liters of ethyl acetate. The pooled solution is concentrated under reduced pressure to 1/10 its volume and the concentrate treated with 2 g. of activated carbon. The solution is filtered and concentrated to a residue. The residue is dissolved in 20 ml. of the equilibrated lower phase of the solvent system obtained by mixing 1 part water, 5 parts dioxane, and 2 parts cyclohexane and mixed with 40 g. of diatomaceous earth. The mixture is packed on the top of a partition column made up of 200 g. of diatomaceous earth and treated in a similar fashion to the corresponding column used in Example 1. The 567 ml. of eluent obtained after the first 1315 ml. of percolate, is concentrated, yielding 526 mg. of a crystalline material. The material is recrystallized 3 times from acetone giving 1,17α-dihydroxycorticosterone having the following physical characteristics: M.P. 210–212.5°; $[\alpha]_D^{25}$ +136° in methanol $\lambda_{max}$. 240 mμ, $\epsilon$15,600; infra-red spectrum $\lambda_{max}^{KBr}$. 2.91, 5.84, 5.99, 6.20, 9.50 and 9.71μ

*Example 5*

| Organism | Substrate | | | | | | | | | | | |
|---|---|---|---|---|---|---|---|---|---|---|---|---|
| | A | B | C | D | E | F | G | H | I | J | K | L |
| S. aureofaciens (ATCC 10,762) | X | X | X | | | X | X | | | X | | | X |
| S. aureus (ATCC 3309) | X | | | | | X | | | | | | | X |
| S. purpureochromogenus (ATCC 3133) | X | X | | | | | | | | | | | X |
| S. lavendulae | X | X | | | | | | | | | | | X |
| S. griseocarneus (ATCC 12,628) | X | X | X | | | | | X | | | | | X |
| S. halstedii (CBS) a | X | X | X | | X | X | | | | X | | | X |
| S. rubrireticuli | X | X | | | X | X | | X | X | X | | | X |
| S. antibioticus | X | X | | | | | | | | | | | X |
| S. nitrosporeus (NIA) b | X | | | X | X | | | X | | X | | | X |
| S. celluloflavus | X | X | | | X | | | X | | | | | X |
| S. viridifaciens (ATCC 11,389) | X | X | | | | | | | | | X | X | X |
| S. fulvissimus (NRRL B1453) | X | X | X | | | | | X | | | | | X |
| S. hygroscopicus | X | X | X | X | | | | | | | | | X |

A=Hydrocortisone.
B=9α-fluoro hydrocortisone.
C=9α-fluoro-16α-hydroxy hydrocortisone.
D=6α-methyl-1,4-pregnadiene-11β,17α,21-triol-3,20-dione.
E=11-desoxy corticosterone.
F=Progesterone.
G=Triamcinolone (9α-fluoro-11β,16α,17α,21-tetrahydroxy-1,4-pregnadiene-3,20-dione.
H=16α-hydroxy hydrocortisone.
I=9α-fluoro-6α-methyl-1,4-pregnadiene-11β,17α,21-triol-3,20-dione.
J=Substance S.
K=Δ⁹⁽¹¹⁾-Substance S.
L=Indications of 1-hydroxylation shown by paper chromatography or isolation and identification.
a=Centraalbureau voor Schimmelcultur.
b=Tokyo (Y. Okami Strain 0-20).

A series of experiments were carried out as described in the preceding examples. The various species of Streptomyces and the substrates used are summarized above. In each instance 1-hydroxylation takes place.

We claim:

1. The method of converting a steroid selected from the group consisting of 4-pregnene-3,20-dione; 17α,21-dihydroxy-4-pregnene-3,20-dione; 11β,17α,21-trihydroxy-4-pregnene-3,20-dione; 9α-fluoro-11β,17α,21-trihydroxy-4-pregnene-3,20-dione; 9α-fluoro-11β,16α,17α,21-tetrahydroxy-4-pregnene-3,20-dione and 11β,16α,17α,21-tetrahydroxy-4-pregnene-3,20-dione into a 1-hydroxy derivative thereof which comprises subjecting said steroid to the action of enzymes of microorganisms of the genus Streptomyces selected from the group consisting of *S. aureofaciens, S. aureus, S. purpureochromogenus, S. lavendulae, S. griseocarneus, S. rubrireticuli, S. antibioticus, S. nitrosporeus, S. celluloflavus, S. viridifaciens* and *S. fulvissimus* under oxidizing conditions and recovering the said 1-hydroxy steroid which is formed.

2. The method of claim 1 wherein the steroid is 9α-fluoro-11β,17α,21-trihydroxy-4-pregnene-3,20-dione.

3. The method of claim 1 wherein the steroid is 11β,17α,21-trihydroxy-4-pregnene-3,20-dione.

4. The method of claim 1 wherein the steroid is 4-pregnene-3,20-dione.

5. The method of claim 1 wherein the steroid is 17α,21-dihydroxy-4-pregnene-3,20-dione.

6. The method of claim 1 wherein the steroid is 9α-fluoro-11β,16α,17α,21 - tetrahydroxy-4-pregnene-3,20-dione.

7. The method of claim 1 wherein the steroid is 11β,16α,17α,21-tetrahydroxy-4-pregnene-3,20-dione.

8. The method of preparing 9α-fluoro-1,11β,17α,21-tetrahydroxy-4-pregnene-3,20-dione which comprises subjecting 9α-fluoro-11β,17α,21-trihydroxy-4-pregnene-3,20-dione to the action of enymes produced by the microorganism *Streptomyces aureofaciens* under oxidizing conditions and recovering the 1-hydroxy pregnene which is formed.

References Cited in the file of this patent

UNITED STATES PATENTS

| 2,982,694 | Stoudt et al. | May 2, 1961 |

FOREIGN PATENTS

| 723,881 | Great Britain | Feb. 16, 1955 |
| 154,976 | Australia | Feb. 2, 1954 |
| 210,363 | Australia | Aug. 29, 1957 |